March 16, 1971  K. STROBEL ET AL  3,570,244
POWER PISTON DRIVE FOR ARMATURES

Filed July 24, 1969  3 Sheets-Sheet 1

INVENTORS
KARL STROBEL
HERMANN KRAIS
HANS FREISLER
BY *Ernest Montague*
ATTORNEY.

March 16, 1971 K. STROBEL ET AL 3,570,244
POWER PISTON DRIVE FOR ARMATURES
Filed July 24, 1969 3 Sheets-Sheet 3

INVENTORS
KARL STROBEL
HERMANN KRAIS
HANS FREISLER
BY
ATTORNEY.

United States Patent Office 3,570,244
Patented Mar. 16, 1971

3,570,244
POWER PISTON DRIVE FOR ARMATURES
Karl Strobel, Heidenheim, Hermann Krais, Nattheim, and Hans Freisler, Heidenheim, Germany, assignors to Johannes Erhard, H. Waldenmaier Erben, Suddeutsche Armaturenfabrik, Heidenheim, Germany
Filed July 24, 1969, Ser. No. 844,418
Claims priority, application Germany, Oct. 1, 1968, P 18 00 424.5
Int. Cl. F15b 1/02
U.S. Cl. 60—51                                4 Claims

ABSTRACT OF THE DISCLOSURE

A servo-piston drive for a control member for flowing gaseous or liquid fluids, which control member is adjustable between a closed position and an open position by a differential piston movable in a working cylinder, which drive comprises a working cylinder defining a chamber on opposite sides of at least one differential piston and includes on one side a pipeline serving as inlet and outlet and on the other side is connected with a pressure reservoir. A by-pass line connects both sides of the differential piston. Non-return valves in the by-pass line close off the chambers in front of and behind the differential piston. The differential piston is movable in the closing direction of the control member upon exerting of pressure in the pipeline and charging the pressure reservoir, thereby positively opening one of the non-return valves and balancing out the pressures in the chambers in front of and behind the differential piston and charging the pressure reservoir to the control pressure, and upon reversal of pressure in the pipeline, the bypass line is shut off by the other of the non-return valves, so that the differential piston is forced back by the pressure of the pressure reservoir and the control member is opened.

---

The present invention relates to a servo-piston drive for pipe fittings having a working cylinder and a differential piston, which has on the one side a pipeline serving as inlet and outlet and on the other side is connected to a pressure reservoir, both sides of the differential piston being connected in the working cylinder via a by-pass line with non-return valves which close it off from the cylinder chambers.

In known servo-piston drives for the actuating of pipe fittings two pipelines are necessary to control the piston. In the one direction of movement of the piston, the one pipeline serves as delivery line and the other pipeline as return line. After the switching of a control member, such as a four-way valve or the like, the piston moves in the opposite direction, the mentioned pressure line then serving as return line and the aforementioned return line as delivery line.

In these known embodiments, there is the disadvantage that a number of pipelines is necessary which lines can leak at their points of connection. Particularly in the case of very long and corrosion-resistant pipelines, such as, for instance, in naval construction, where they are subjected to sea water, considerable expenses arise. With only a single pipeline which serves as both delivery and return line, the piston of the servo-piston drive can be acted on by the pressure fluid or released from pressure solely on one side. Upon the feeding of the fluid under pressure, the piston moves for instance in the closing direction of the pipe fitting and upon the relief of the pressure from the piston, the backward movement of the piston must be effected either by springs which have the disadvantage of having large dimensions and of becoming fatigued in case they are under tension for a long time, or else by means of a pressure reservoir or the like. Losses by leakage in the space acted on by the fluid in the pressure reservoir, for instance on the piston rod or on the pressure reservoir itself, reduce the dependability of operation, which constitutes a disadvantage.

It is one object of the present invention, to provide a servo-piston drive which eliminates the aforementioned disadvantages, is simple in construction and is economical to manufacture.

It is another object of the present invention to provide a servo-piston drive wherein upon admitting pressure to the pipeline, the differential piston is moved in the closing direction of the pipe fitting and the pressure reservoir is charged, the non-return valve which is incorporated in the by-pass line remaining closed during the stroke of the differential piston and being positively opened in the end position of the differential piston, whereby leakages at the piston-rod lead-through are counteracted and pressure equalization is produced in the two cylinder chambers in front of and behind the differential piston, whereby the pressure reservoir is charged to a control pressure, and that when the pressure is removed in the pipeline, the other non-return valve closes the by-pass line whereby the differential piston is pushed back by the pressurized fluid in the pressure reservoir and the pipe-fitting (valve) is opened.

With these and other objects in view which will become apparent in the following detailed description, the present invention will be clearly understood in connection with the accompanying drawings, in which.

Figure 1:
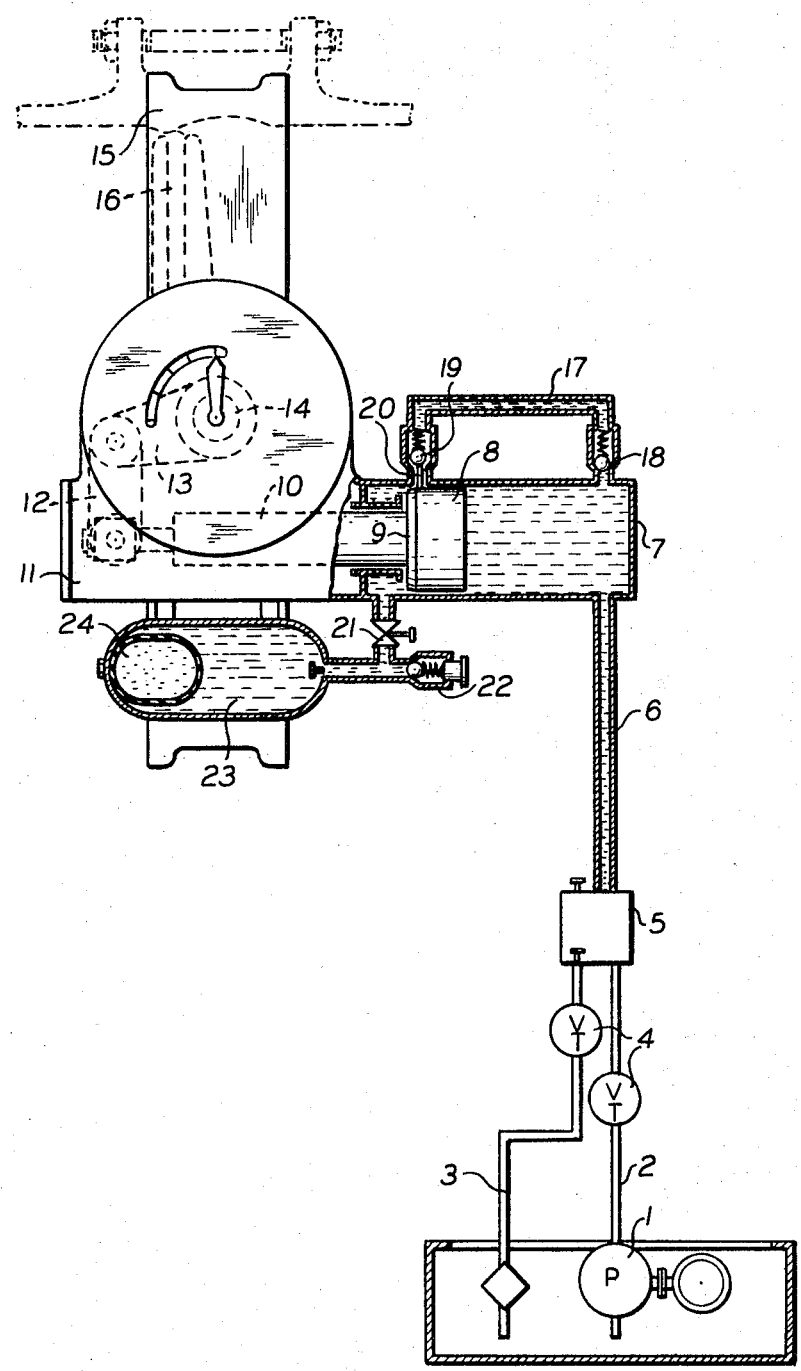
FIG. 1 is a schematic elevation of a servo-piston drive with a double-acting differential piston, partly in section, and a working cylinder with a by-pass line and built-in non-return valves.

Referring now to the drawings, and in particular to FIG. 1, the servo-piston drive comprises a hydraulic pump 1 with a delivery line 2 and a return line 3 with inserted throttle valves 4 for regulating the flow through the same. A control valve 5 is connected on one side with the pressure line 2 and the return line 3. On its other side, the control valve 5 is connected via a pipeline 6 serving as inlet and outlet with a working cylinder 7. In the working cylinder 7 there is slidably guided a differential piston 8 which is sealed off from two cylinder chambers on opposite sides of the piston by contact of the piston with the cylinder walls and which is provided with a cone 9 on the piston-rod side. The piston rod 10 of the differential piston 8 is guided, properly sealed, to the outside and is pivotally connected in a housing 11 at its free end with a lever 12 and a crank arm 13. The crank arm 13 is connected, fixed for rotation, with a shaft 14 by which a flap valve 16 located in a valve housing 15 can be opened or closed. A by-pass line 17 connects the two chambers in front of and behind the differential piston 8 in the working cylinder 7. A non-return valve 18 and a non-return valve 19 are provided in the by-pass line 17. The non-return valve 19 has a pin 20 or the like by which the non-return valve 19 is positively opened against its closing direction when the cone 9 of the differential piston 8 passes over it. The chamber in the working cylinder 7 on the side of the piston rod is connected via a shut-off valve 21 (in an open position) and a safety valve 22 with a pressure reservoir 23 having a gas-filled elastic bladder 24. For the closing of the valve fitting the hydraulic pump 1 feeds the control fluid via the delivery line 2, the throttle valve 4 and control valve 5 and the pipeline 6 into the working cylinder 7. In this connection the return line 3 is connected, without pressure, to the control valve 5. The differential piston 8 is forced by means of the control fluid into its closed position, as shown in FIG. 1. In this connection, the fluid in the chamber in the working cylinder 7 located on the piston-rod side is forced via the shut-off valve 21 into the pressure reservoir 23 which is filled with the same fluid and it compresses the bladder 24. Upon reaching its end position, the differential piston 8, by means of its cone 9, opens the non-return valve 19 in a direction opposite to its direction of closure. In this way an equalization is obtained on both sides of the differential piston 8, so that losses by leakage in the servo-piston drive can be balanced out. For the closing of the valve fitting (16), the control valve 5 is switched over, the pipeline 6 being connected with the return line 3. In this case, the flow of the control fluid through the delivery line 2 and the control valve 5 is blocked. By the expansion of the compressed bladder 24 in the pressure reservoir 23, the fluid is forced via the shut-off valve 21 (in an open position) into the chamber of the operating cylinder 7 located on the piston-rod side and it moves the differential piston 8 toward its retracted position, the pipeline 6 serving as return line. In order to stop the valve fitting (16) in an intermediate position, the delivery line 2, the return line 3 and the pipeline 6 are blocked in the control valve 5. In this connection, the bladder 24 presses on the fluid in pressure reservoir 23 which pressurizes the fluid in the chamber on the piston-rod side against the differential piston 8, whereby a pressure is built up in the working cylinder 7 on the side of the differential piston 8 facing away from the piston rod 10, as a result of which the flap valve 16 is held fast in its intermediate position.

Figure 2:
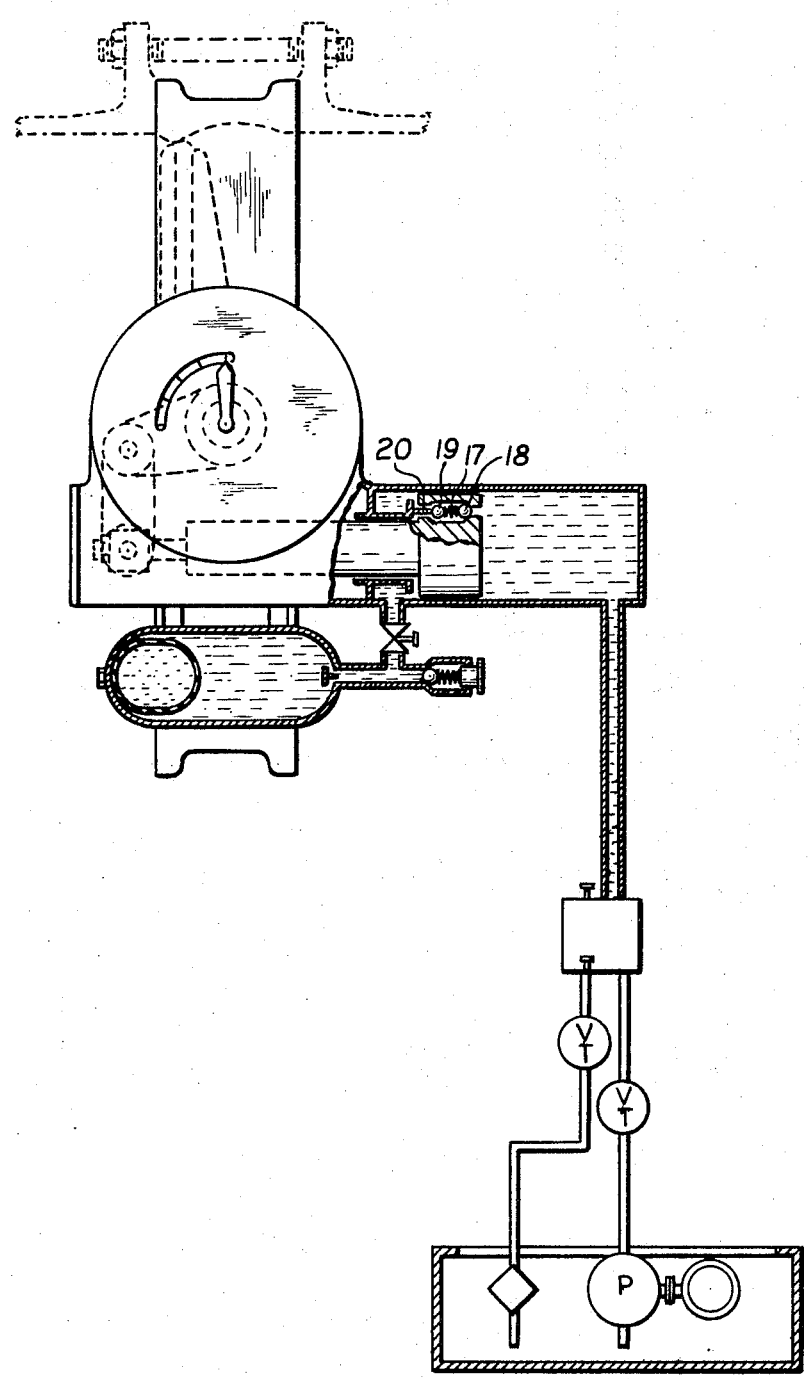
FIG. 2 is a schematic elevation of the servo-piston drive disclosed in FIG. 1, but with a by-pass line and non-return valves included in the differential piston.

In accordance with FIG. 2, the non-return valves 18, 19 and the by-pass line 17 are built in the differential piston 8. When the end position is reached, the pin 20 of the non-return valve 19, by coming against a vertical wall in the working cylinder 7, opens the non-return valve 19 in a direction opposite to its direction of closing.

Figure 3:
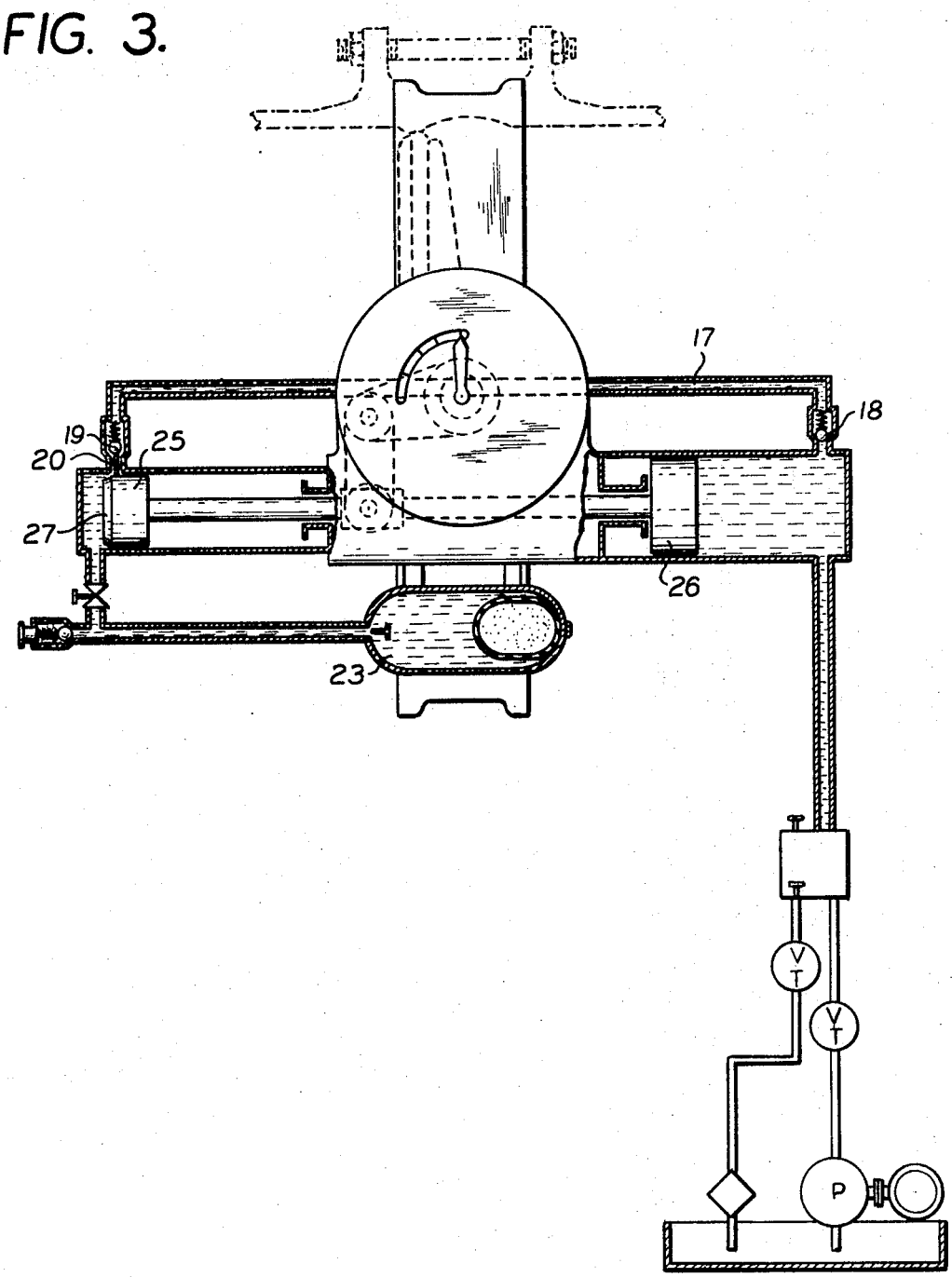
FIG. 3 is a schematic elevation of a servo-piston drive with two single-acting pistons of different sizes.

In accordance with FIG. 3, the servo-piston drive has a smaller piston 25 and a larger piston 26 separated from each other, the cylinder chamber in front of the piston 25 being connected with the pressure reservoir 23 and the by-pass line 17 which discharges into the cylinder chamber in front of the piston 26. When the end position is reached, the piston 25 with its cone 27, by means of the pin 20, opens the non-return valve 19 in the by-pass line 17.

While we have disclosed several embodiments of the present invention, it is to be understood, that these embodiments are given by example only and not in a limiting sense.

We claim:
1. A servo-piston drive for a control member for flowing gaseous or liquid fluids, which control member is adjustable between a closed position and an open position by a differential piston movable in a working cylinder, said drive comprising:

a working cylinder defining a chamber on opposite sides of at least one differential piston and including on one side a pipeline serving as inlet and outlet and on the other side being connected with a pressure reservoir, a by-pass line connecting both said sides of said differential piston, non-return valves in said by-pass line closing off said chambers in front of and behind said differential piston, said differential piston being movable in the closing direction of said control member upon exertion of pressure in said pipeline to charge said pressure reservoir, thereby positively opening one of said non-return valves and balancing out the pressures in said chambers in front of and behind said differential piston and charging said pressure reservoir to the control pressure, and upon reversal of pressure in said pipeline, said bypass line being shut off by the other of said non-return valves, so that said differential piston is forced back by the pressure of fluid in said pressure reservoir and said control member is opened.

2. The servo-piston drive, as set forth in claim 1, which includes:

a control valve in said pipeline for shutting off the latter and holding said differential piston in any intermediate position of said control member, whereby said non-return valves prevent a displacement of said differential piston in both directions.

3. The servo-piston drive, as set forth in claim 1, wherein:

said differential piston has incorporated therein said non-return valves and said by-pass line.

4. The servo-piston drive, as set forth in claim 1, comprising:

a first piston,
a second piston having a diameter smaller than that of said first piston,
said working cylinder defining a chamber on opposite sides of said first and second pistons,
said chamber in front of said second piston being connected with said pressure reservoir and with said by-pass line, the latter discharging into said chamber in front of said first piston.

References Cited

UNITED STATES PATENTS

| 1,985,361 | 12/1934 | Anthony et al. | 91—401X |
| 2,099,368 | 11/1937 | Levy | 92—134X |
| 3,450,006 | 6/1969 | White | 91—401 |

EDGAR W. GEOGHEGAN, Primary Examiner

U.S. Cl. X.R.

91—394; 92—134